(12) United States Patent
Soderquist

(10) Patent No.: US 6,874,810 B2
(45) Date of Patent: Apr. 5, 2005

(54) AIRBAG COVER DEPLOYMENT FLAPS

(75) Inventor: Quin Soderquist, South Weber, UT (US)

(73) Assignee: Autoliv ASP. Inc., Ogden, UT (US)

( * ) Notice: Subject to any disclaimer, the term of this patent is extended or adjusted under 35 U.S.C. 154(b) by 76 days.

(21) Appl. No.: 10/115,856

(22) Filed: Apr. 3, 2002

(65) Prior Publication Data

US 2003/0189319 A1 Oct. 9, 2003

(51) Int. Cl.[7] .............................................. B60R 21/20
(52) U.S. Cl. ................................................... 280/728.3
(58) Field of Search ........................... 280/728.2, 728.3, 280/730.1, 731, 732

(56) References Cited

U.S. PATENT DOCUMENTS

| 3,778,085 | A | * | 12/1973 | Lipkin ......................... 280/734 |
| 4,842,300 | A | * | 6/1989 | Ziomek et al. ............. 280/732 |
| 5,009,452 | A | * | 4/1991 | Miller ...................... 280/730.1 |
| 5,242,192 | A | | 9/1993 | Prescaro et al. ............ 280/730 |
| 5,348,343 | A | | 9/1994 | Hawthorn .................... 280/730 |
| 5,364,124 | A | | 11/1994 | Donegan et al. ............ 280/730 |
| 5,588,674 | A | | 12/1996 | Yoshimura et al. ......... 280/732 |
| 5,630,614 | A | * | 5/1997 | Conlee et al. ........... 280/730.1 |
| 5,678,850 | A | | 10/1997 | Ricks et al. .............. 280/728.2 |
| 5,772,239 | A | | 6/1998 | Seymour ................... 280/728.3 |
| 5,810,388 | A | | 9/1998 | Berardi et al. ........... 280/728.3 |
| 5,913,534 | A | | 6/1999 | Klingauf .................. 280/728.3 |
| 6,364,351 | B1 | | 4/2002 | Hier et al. .................. 280/732 |
| 6,460,880 | B1 | * | 10/2002 | Gallagher et al. .......... 280/732 |
| 6,474,686 | B1 | * | 11/2002 | Higuchi et al. .......... 280/743.1 |
| 2004/0094939 | A1 | * | 5/2004 | Debler et al. ............... 280/732 |
| 2004/0119267 | A1 | * | 6/2004 | Cowelchuck et al. .... 280/728.3 |

FOREIGN PATENT DOCUMENTS

| DE | 4016047 | * | 11/1991 | |
| GB | 2362858 | | 12/2001 | ........... B60R/21/16 |

* cited by examiner

Primary Examiner—Bryan Fischmann
(74) Attorney, Agent, or Firm—Sally J. Brown

(57) ABSTRACT

An apparatus is provided to reinforce an airbag while it is deploying through an airbag cover. An undeployed airbag is wrapped in a cover deployment flap that may be a thin piece of material. The cover deployment flap is located between the airbag and the airbag cover. As the airbag deploys, the cover deployment flap remains between the airbag and the airbag cover until the airbag cover is sufficiently open. The cover deployment flap may have multiple folded configurations to wrap the undeployed airbag. The cover deployment flap may further include an overlap that allows the airbag to release from the cover deployment flap once the airbag cover is open.

15 Claims, 4 Drawing Sheets

AIRBAG COVER DEPLOYMENT FLAPS

BACKGROUND OF THE INVENTION

1. Field of the Invention

The present invention relates to an apparatus for reducing the failure rate of automobile airbags. More particularly, the present invention relates to an apparatus for reinforcing an airbag to prevent damage to the airbag when deployed through the airbag cover.

2. Technical Background

Inflatable airbags are well accepted in their use in motor vehicles and have been credited with preventing numerous deaths and accidents. Some statistics estimate that frontal airbags reduce fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Thus, airbag use presents clear benefits.

In view of the apparent success of airbags, automobile designers and the consuming public have been anxious to increase the number of airbags present in vehicles. Currently most automobiles being manufactured have driver side and passenger side airbags. However, designers are identifying increasingly more locations to place airbags throughout the vehicle. For example, side impact airbags and overhead inflatable curtains are becoming more and more common in vehicles. These airbags prevent injury that might occur in side-impact collisions. Other airbag designs have been created to protect less obvious portions of the body, such as the knee.

In order to place multiple airbags throughout an automobile, designers have sought after ways of reducing the storage size of airbags. One, method of reducing the storage size of an airbag is to decrease the thickness of the airbag material. By decreasing the thickness of the airbag material the inflated volume of the airbag will remain the same, but the undeployed airbag storage volume will be reduced.

Reducing the thickness of the airbag also has the added advantage of limiting the force in which an airbag "impacts" an occupant. As an airbag deploys and first comes in to contact with the occupant, the airbag might slap the occupant it is about to restrain. The force of the slap is generally equal to the mass of the airbag multiplied by the acceleration of the airbag. Reducing the mass of the airbag by decreasing the thickness will correspondingly decrease the force of the deploying airbag. Thus reducing the mass of the airbag provides additional safety features.

However, decreasing the thickness of an airbag can have some negative effects on the airbag module. One negative effect is that thinner material is generally weaker than thicker material. Testing of the new design of an airbag using light weight airbag material was found to have failures while breaking through the tear seams of the airbag cover. The testing revealed that aneurysm type failures were developing in the airbag as the airbag broke through the tear seams of the airbag cover.

Various airbags were tested in these experiments, such as a double section accordion type airbag. A double section airbag is comprised of two individual accordion shaped sections that create a fold seam between the two folded sections. This folded configuration produces inflation results that are desirable in some applications. The testing of this airbag revealed that the interaction between the fold seam of the airbag and the orientation of the tear seams were a factor in producing these failures.

The testing revealed that when the fold seam of the double section accordion type airbag was perpendicular to the orientation of the tears seam, failures in the airbag occurred. These failure locations matched the orientation of the tear seam. Conversely, it was noted that when the orientation of the airbag fold seam was parallel to the tear seam, no failures occurred. Testing suggests that the parallel alignment of the fold seam and the tear seam produce few, if any, failures because the parallel alignment allowed for even distribution of the airbag on the airbag cover. On the other hand, the perpendicular alignment concentrated areas of high force and stress on small portions of the airbag, thus causing the aneurysm type failures.

These areas of high force and stress are believed to be created as the airbag impacts the airbag cover and as portions of the airbag deploy through the airbag cover. The impact of the airbag on the back of the airbag cover creates high stress points along various contours of the airbag cover. These forces and stresses can cause failures in the airbag, especially along the contours that create the tear seam.

Additionally, high stress concentrations may occur in the airbag when the tear seam initially opens releasing only a small section of the airbag. As small sections of the airbag bubble out of the airbag cover, areas of high stress are created in the bubbled out sections of airbag. Furthermore, if the edges of the airbag cover are rough, then these rough edges might rub against the airbag as it deploys, causing holes and tears in the airbag.

While these failures occurring in the airbags were substantially corrected by parallel alignment of the fold seam and the tear seam, certain airbag applications prohibit a parallel alignment. In various airbag applications, the fold seam of the airbag must be oriented perpendicular to the tear seam of the airbag cover. Thus, the problem remains of reinforcing a thinner gauge airbag having a perpendicular alignment.

Therefore, what is needed in the art is an airbag apparatus capable of a perpendicular alignment of the fold seam to the tear seam that implements a thinner gauge of airbag material. What is further needed is an airbag structure capable of distributing forces and stresses induced by opening an airbag cover. A need also exists for reinforcing an airbag as small sections of the airbag bubble out of a partially opened tear seam.

What is further needed is a cover deployment member to limit the contact between the airbag and the airbag cover. A need also exists to provide a cover deployment member that may be easily implemented and interchangeable in multiple folded airbag configurations. Another need exists for reinforcing various airbag designs with little additional part and assembly costs. What is further needed is an apparatus to reinforce an airbag having a fold seam perpendicular to the tear seam during deployment through an airbag cover.

BRIEF SUMMARY OF THE INVENTION

The apparatus and methods of the present invention have been developed in response to the present state-of-the-art, and, in particular, in response to problems and needs in the art that have not yet been fully resolved by currently available airbag systems. Thus, it is an overall objective of the present invention to provide an apparatus for enhancing the effectiveness of airbag systems.

An airbag reinforcing member is provided comprising a cover deployment flap configured to be selectively disposed between an undeployed airbag and an airbag cover. The cover deployment flap is configured to receive a stress induced by the airbag deploying through the airbag cover. In one embodiment, the cover deployment flap has a first end and a second end, wherein the first end substantially enwraps a first portion of the airbag and the second end substantially enwraps a second portion of the airbag. Additionally, the first end and the second end have an overlapping portion at a location where the first end and second end meet the undeployed airbag and the airbag cover.

The cover deployment flap is configured to remain disposed between the airbag and the airbag cover during expansion of the airbag through the airbag cover. Thus, the stress placed on the airbag may be partially distributed to the cover deployment flap. Other embodiments of the cover deployment flap may employ an additional cover deployment flap. Thus, the first cover deployment flap and the second cover deployment flap could have an overlap, wherein the overlap is configured to be substantially situated between the undeployed airbag and the airbag cover.

The cover deployment flaps are typically made of material similar to as the airbag. The first cover deployment flap may also be comprised of the same material as the airbag. The cover deployment flap may be an integrally formed portion of the airbag. Other cover deployment flaps may be attached to an airbag housing. Yet other cover deployment flap designs may not be attached to the airbag module. Generally, the cover deployment flap is a rectangular member that can be folded into various configurations to enwrap the airbag. For example, the cover deployment flap may be folded into an envelope configuration, wherein each half of the undeployed airbag is enwrapped by the cover deployment flap in an envelope configuration. Other embodiments may employ "C" shaped cover deployment flaps that may enwrap the entire undeployed airbag or that may have two "C" shaped cover deployment flaps that each enwrap a half of the airbag.

Some airbag and airbag cover designs may require a significant overlap of either two ends of a cover deployment flap or two cover deployment flaps. The overlap of the cover deployment flap allows the cover deployment flap to be maintained between the airbag cover and an expanding airbag. Further, the overlap should be oriented substantially parallel with the folded cushion orientation.

These and other advantages of the present invention will become more fully apparent from the following description and appended claims, or maybe learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings only provide selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–4, wherein like reference numbers indicate identical or functionally similar elements. The members of the present invention, as generally described and illustrated in the figures, may be implemented in a wide variety of configurations. Thus, the following more detailed description of the embodiments of the system and method of the present invention, as represented in the figures, is not intended to limit the scope of the invention, as claimed, but is merely representative of presently preferred embodiments of the invention.

Figure 1:
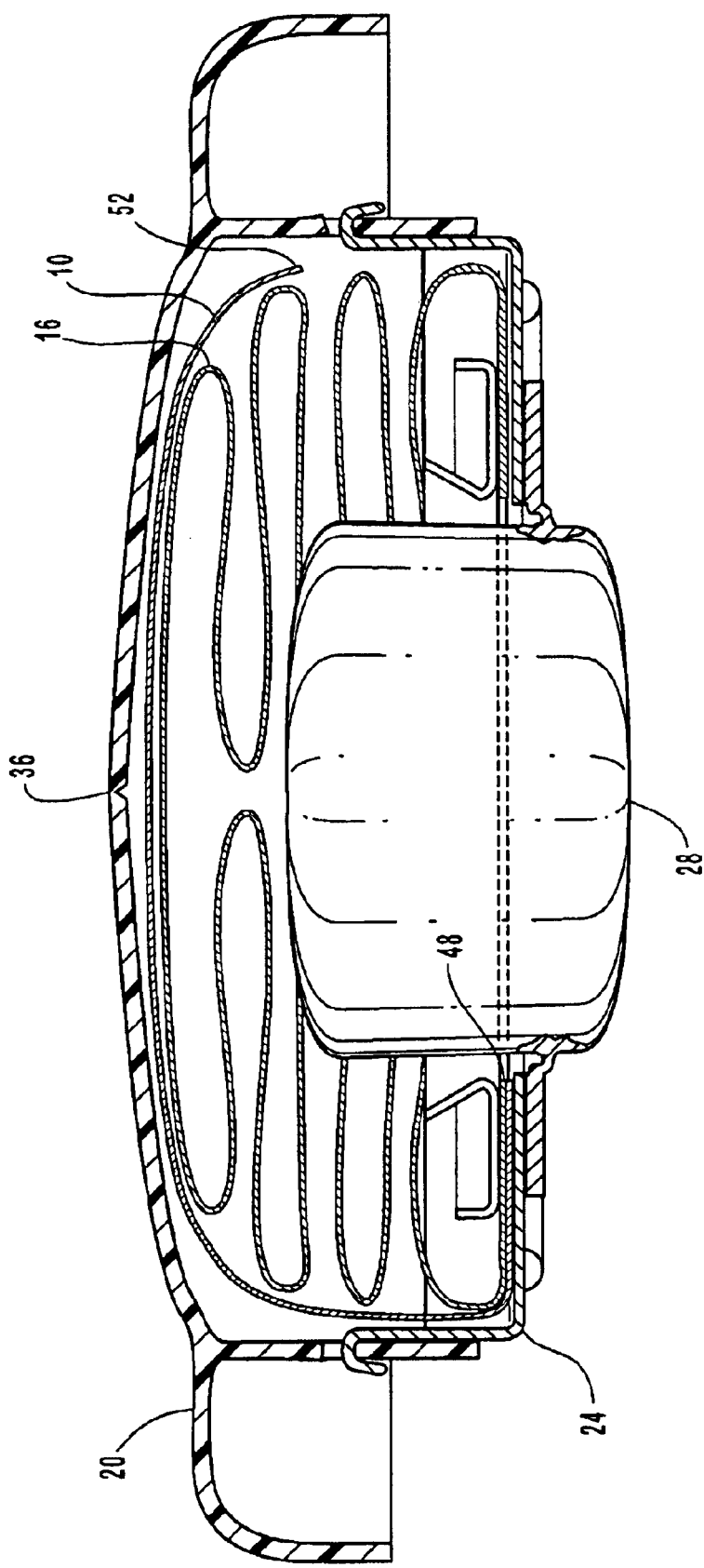
FIG. 1 is a cross-sectional view of an undeployed airbag module incorporating a cover deployment flap.

FIG. 1 is a cross-sectional view of an airbag module having a cover deployment flap 10 situated between an airbag 16 and an airbag cover 20. The cover deployment flap 10 is comprised of a layer of material that provides an insulation and reinforcement layer for the airbag 16. The cover deployment flap 10 is generally positioned within an airbag module, where the airbag module is generally comprised of an airbag cover 20 and an airbag housing 24.

The housing 24 is typically a rigid member that provides a support and mounting structure for airbag module components. The airbag cover 20 is generally formed from a weaker material than is the housing 24, such as a plastic. The airbag cover 20 provides a surface than may be exposed to the inside of the automobile cabin and also a surface that may open to release the airbag 16. The housing 24 and the airbag cover 20 may each have fastening members to couple the two sections together to form an internal volume. The airbag module may be situated in several locations with an automobile, including the steering wheel, the passenger side dash, and the doors.

The airbag 16 and the accompanying cover deployment flap 10 are located within the internal volume of the airbag module. While located within the airbag module, the cover deployment flap 10 substantially enwraps the undeployed airbag 16, such that at least a portion of the cover deployment flap 10 is between the airbag 16 and airbag cover 20. The cover deployment flap 10 is configured to reinforce the material of the airbag 16. The cover deployment flap 10 protects the airbag 16 from directly impacting the airbag cover 20 and further reinforces the airbag 16 as the initial inflating sections of the airbag 16 force out the airbag cover 20.

Reinforcement of the airbag 16 is required because of the high stresses placed upon the airbag 16 as it rapidly inflates and forces the airbag cover 20 open. Deployment of the airbag 16 occurs as an inflator 28 rapidly forces a large volume of gas into the airbag 16. The gas filling the airbag 16 increases the volume of the airbag 16 as it is situated within the confined space of the airbag module. As the airbag 16 inflates, it applies a force on both the airbag cover 20 and the airbag housing 24. Because the relative strength of the airbag cover 20 is less than the relative strength of the housing 24, the expanding airbag 16 forces through the airbag cover 20.

Typically, the relative strength of the airbag cover 20 is further reduced by a series of tear seams 36 which form releasing doors. Tear seams 36 are generally sections of the airbag cover 20 that have a reduced thickness compared to other portions of the airbag cover 20. The tear seams 36 provide controlled failure locations in the airbag cover 20.

As the airbag 16 presses on the airbag cover 20, the airbag cover 20 will open at the tear seams 36 to allow the airbag 16 to tear through the airbag cover 20.

To reinforce the airbag 16 from the stress and damage that may occur while deploying, at least a portion of the cover deployment flap 10 is located between the airbag 16 and the airbag cover 20. The cover deployment flap 10 may have a section located directly in the deployment path of the airbag 16.

The cover deployment flap 10 is configured to receive a substantial portion of the stress on the airbag 16 as the airbag 16 forces open the airbag cover 20. The tear seams 36 are opened by the airbag 16 applying a force on the cover 20 and forcing the thin portions of the airbag cover 20 to separate. Because the force required to open the tear seams 36 is applied by the airbag 16, high stress points are typically created on the surface of the airbag 16. These stresses can cause portions of the airbag 16 to weaken or fail, especially in airbags 16 using light weight materials. Furthermore, if the edges 44 of the tear seams 36 are not completely smooth once torn open, the edges 44 may cause tears or rips in the airbag 16.

Additionally, if any tears occur as a result of the stress or as a result of contact with sections of the tear seams 36, the tears will occur in the non-inflating cover deployment flap 10. Because the cover deployment flap 10 does not inflate to provide any restraining function for the automobile occupant, the function of the airbag 16 will not be affected by any damage to the cover deployment flap 10.

Another function of the cover deployment flap 10 is to reinforce the airbag 16 as initial portions of the airbag 16 burst through sections of the airbag cover 20 before the entire airbag cover 20 opens, because the airbag cover 20 may typically not open the entire length of the tear seam 36 instantaneously. This may cause small bubble-like sections of the airbag 16 to be forced out of the open tear seam 36. The small bubble portions of the airbag 16 often incur high stresses as the inflator 28 forces high pressure gas into the airbag 16. These high stresses can cause failures in the airbag material, such as tears or holes, especially in low strength and light weight airbag materials.

The cover deployment flap 10 is configured to reinforce the airbag material as small portions of the airbag 16 exit the airbag cover 20 during deployment. Because the cover deployment flap 10 is freely situated between the airbag 16 and the airbag cover 20, portions of the cover deployment flap 10 will be forced out of the openings in the airbag cover 20, by the airbag 16. As the portion of the airbag 16 inflates through the airbag cover 20, the airbag 16 forces the cover deployment flap 10 around the partially inflated portions of airbag 16 that have exited the airbag cover 20.

The cover deployment flap 10 surrounds the bubble like portion of the partially inflated airbag 16 and provides a temporary second layer of airbag material to reinforce the airbag 16 while it completely bursts through the airbag cover 20. Thus, as the pressure within the airbag 16 increases, the stress on the airbag material caused by the pressure will be distributed between the airbag 16 and the cover deployment flap 10. This configuration prevents holes or tears from forming in the airbag 16. Thus, the cover deployment flap 10 allows the airbag 16 to have the strength advantages of a thick airbag material as well as the compactability and low force of a light weight airbag material.

To reinforce the airbag 16 as it deploys through the airbag cover 20, the cover deployment flap 10 must be properly situated in relationship to the airbag 16. FIG. 1 demonstrates an embodiment of the cover deployment flap 10 having a single flap that enwraps a portion of the undeployed airbag 16. The cover deployment flap 10 is configured to remain situated between the airbag 16 and the airbag cover 20 until the airbag 16 deploys through the airbag cover 20. As depicted in FIG. 1, the cover deployment flap 10 is attached to the airbag housing 24 at a fixed end 48, and the cover deployment flap 10 is unattached at a free end 52. Thus as the airbag 16 deploys, the cover deployment flap 10 pivots about the fixed end 48 while the free end 52 lifts through the airbag cover 20, as shown in FIG. 2.

The fixed end 48 of the cover deployment flap 10 can be anchored to multiple sections of the airbag module such as the housing 24, the airbag 16, sections of the airbag cover 20 or the inflator 28. Anchoring the cover deployment flap 10 will keep it attached to the airbag module during deployment. Alternatively, the cover deployment flap 10 may not be attached to any member of the airbag module. Rather, the cover deployment flap 10 could simply be placed between the airbag 16 and the airbag cover 20 until the airbag 16 deploys. As the airbag deploys, the cover deployment flap 10 could be ejected through the airbag cover 20 and out of the path of the deploying airbag 16. This embodiment may allow for a smaller sized cover deployment flap 10 because no anchoring material is required. However, this embodiment may not be preferred if the direction of the ejected flap is in the direction of the occupant.

In general, the cover deployment flap 10 should be sized to maintain a position between the deploying airbag 16 and the airbag cover 20 until the airbag 16 has opened the tear seam 36 in the airbag cover 20. In order to ensure adequate reinforcement of the cover deployment flaps 10, the free end 52 of the cover deployment flap 10 may slightly overhang the folded, undeployed airbag 16. The overhanging material at the free end 52 provides an allowance of material that remains between the airbag 16 and the airbag cover 20 while the airbag 16 begins to inflate. This allowance is demonstrated in FIG. 2 with the partially inflated airbag 16.

Figure 2:
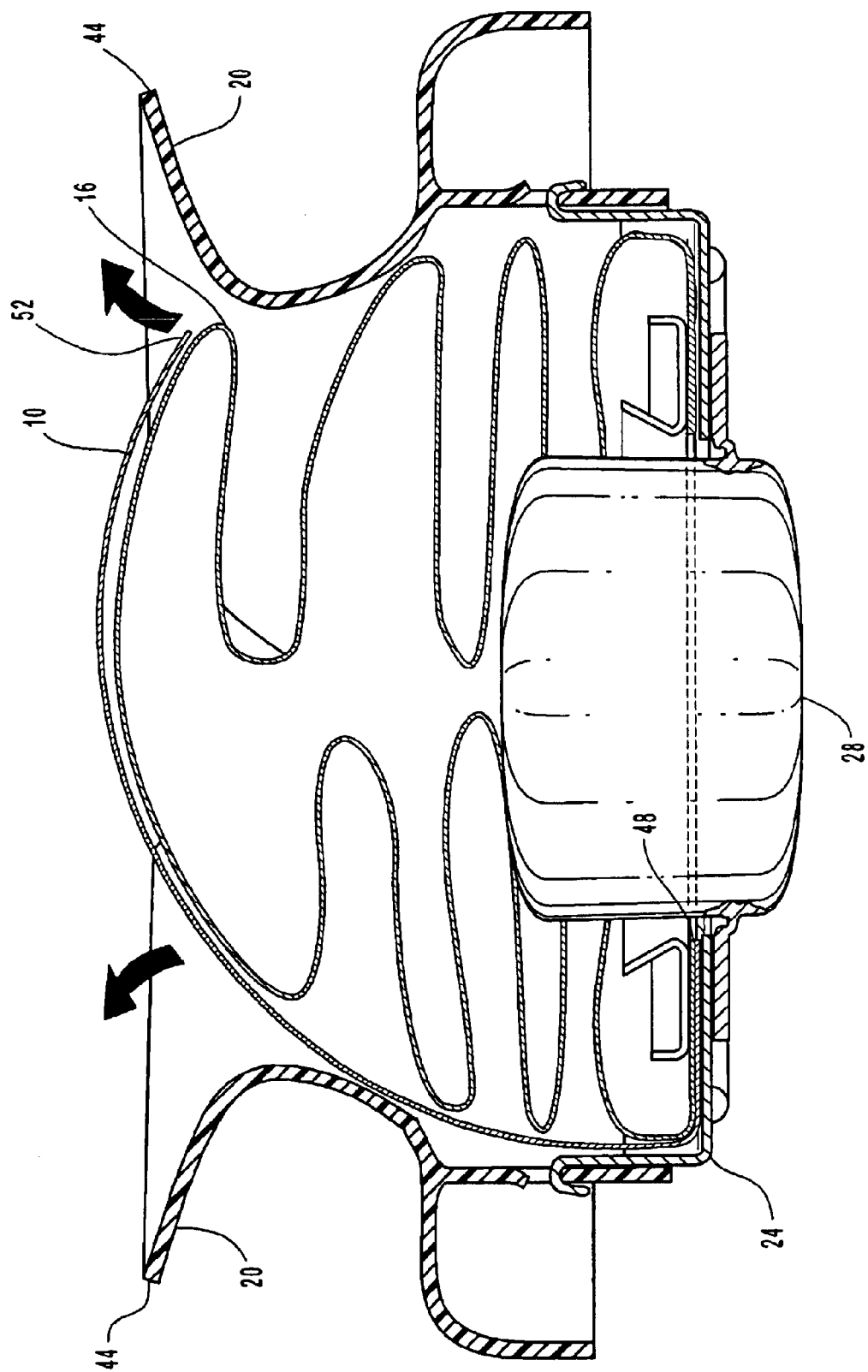
FIG. 2 is a cross-sectional view of a deploying airbag module incorporating a cover deployment flap.

Referring now to FIG. 2, the airbag 16 is depicted in a partially inflated state. The airbag cover 20 is shown in an open state where the airbag cover 20 has opened at the tear seams 36 and created cover doors that open away from the airbag 16 deployment path. FIG. 2 demonstrates that after the airbag cover 20 has been opened and the airbag 16 has partially inflated, the overhanging material of the cover deployment flap 10 has pulled to the edge of the airbag 16. Thus, the overhanging free end 52 allows the cover deployment flap 10 to maintain a reinforcement position during the critical moments of deployment. Once the airbag 16 is completely inflated the cover deployment flap 10 will be displaced to the side of the airbag module and out of the way of the fully deployed airbag 16.

While the cover deployment flap 10 illustrated in FIG. 1 and FIG. 2 depicts a cover deployment flap 10 reinforcing an accordion folded airbag 16, different embodiments and designs of cover deployment flaps 10 may be employed to accommodate any number of airbag 16 designs. One such alternative cover deployment flap 10 design is the double "C" cover deployment flap depicted in FIG. 3. The double "C" type cover deployment flap 110a. 110b, as depicted, is comprised of two individual pieces of material, a first cover deployment flap 110a and a second cover deployment flap 110b. The "C" shaped cover deployment flaps 110a, 110b allow for various airbag types and various folded airbag configurations. In the embodiment depicted in FIG. 3, the airbag 116 is a double section accordion airbag 116.

Figure 3:
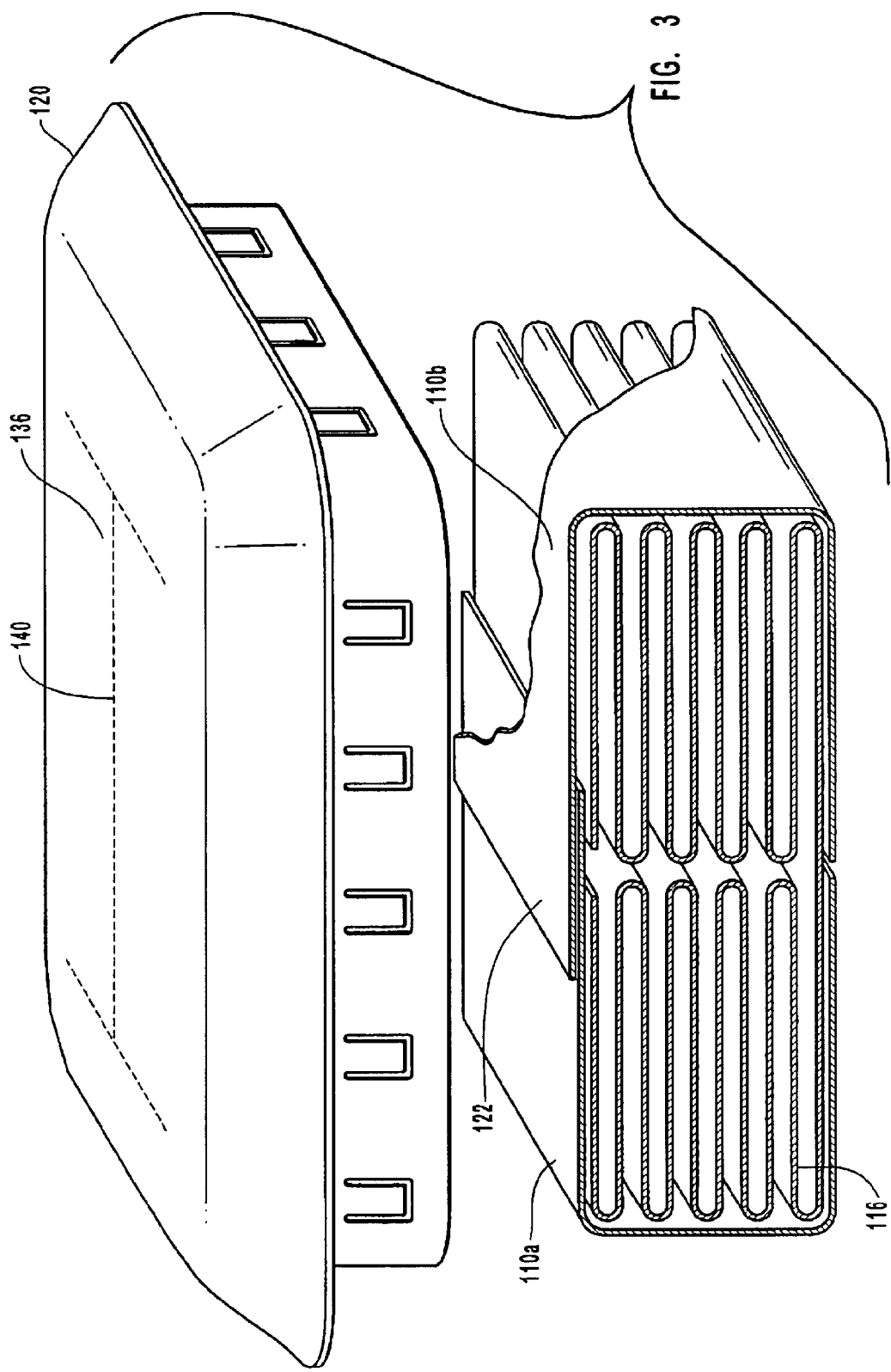
FIG. 3 is a perspective view of an embodiment of a cover deployment flap and airbag module.

As in previously illustrated embodiments, a function of the cover deployment flaps 110a, 110b is to provide a protective layer between the airbag 116 and the airbag cover 120 during the initial stages of deployment. This is accomplished by enwrapping the first cover deployment flap 110a around a first portion of the airbag 116 and enwrapping the second cover deployment flap 110b around a second portion of the airbag 116. As illustrated in FIG. 3, the first and second portions of the airbag 116 correspond to the two accordion folded sections of the airbag 16. The first cover deployment flap 110a and the second cover deployment flap 110b form an overlap 122 that is situated between the airbag 116 and the airbag cover 120.

The overlap 122 generally has an opening location where the two cover deployment flaps 110a, 110b intersect. The opening location is the junction of the cover deployment flaps 110a, 110b and is not sealed or sewn. The opening location provides a releasing separation place in the cover deployment flap 110a, 110b to release the airbag 116 once the airbag cover 120 is opened.

The overlap 122 provides a continuous reinforcement layer between the airbag 116 and the airbag cover 120 during deployment of the airbag 116. As the airbag 16 inflates, the volume of the airbag 116 that is within the two "C" shaped cover deployment flaps 110a, 110b increases, which correspondingly decreases the size of the overlap 122. Preferably, the size of the overlap 122 should allow the cover deployment flaps 110a, 110b to remain between the airbag 116 and the airbag cover 120 until the airbag cover 120 has opened sufficiently to release the airbag 116. Thus, the size of the overlap 122 should be determined by the degree of inflation of the airbag 116 that is required to open the airbag cover 120.

For example, in the embodiment depicted in FIG. 3, the overlap size will depend on the degree of deflection that will occur in the airbag cover 120 before the airbag cover 120 completely opens. This occurs as the airbag 116 expands and applies a force on the cover deployment flaps 110a, 110b. In turn the cover deployment flaps 110a, 110b place a force on the inside of the airbag cover 120. At a force magnitude determined by the material characteristics and design of the airbag cover 120, the inflating airbag 116 will cause the airbag cover 120 to deflect away from the inflating airbag 116. Further, as the airbag 116 causes the airbag cover 20 to deflect, the cover deployment flaps 110a, 110b also deflect away from the inflating airbag 116.

The deflection in the cover deployment flaps 110a, 110b decreases the overlap 122 of the two cover deployment flaps 110a, 110b, by increasing the size of the airbag 116 that the cover deployment flaps 110a, 110b enwrap. Eventually, the airbag 116 will apply a sufficient force on the cover deployment flaps 110a, 110b and the airbag cover 120 to break the tear seams 136. The overlap 122 is sized so that the cover deployment flaps 110a, 110b will maintain the overlap 122 until the airbag 116 has opened the airbag cover 120. In an embodiment for a conventional double section accordion airbag 116, one possible overlap 122 is two inches, wherein two inches of the first cover deployment flap 110a overlap two inches of the second cover deployment flap 110b. However, the size of overlap 122 may depend on the type of airbag 116 and airbag cover 120, the size of the airbag 116, and the orientation of the airbag module members.

The airbag cover 120 may employ various types of tear seams 136 in opening the airbag cover 20. FIG. 3 demonstrates an "H" shaped tear seam 136, having center tear seam 140 that substantially bisects the airbag cover 20. However, the airbag cover 120 may employ an "I" shaped tear seam wherein the center tear seam 140 is rotated 90°, or "U" shaped tear seam wherein the center tear seam 140 is moved near the edge of the airbag cover 120. Other airbag covers 120 may not employ tear seams 136 but rather use hinged doors that release a latch to release the airbag 116 in the automobile. A hinged door would obtain many of the same benefits as would a tear seam from a cover deployment flap.

With each of these variations, the size of the cover deployment flaps 110a, 110b and particularly the size of overlap 122 must be designed to account for the degree of inflation of the airbag 116 required to open the airbag cover 120. If the airbag cover 120 opens as a result of a small inflation of the airbag 116, the overlap 122 of the cover deployment flaps 110a, 110b may be relatively small. Alternatively, if a large deflection in the airbag cover 120 is required to open the airbag cover doors, the overlap 122 will be somewhat large to maintain the cover deployment flap 110a, 110b position until the airbag 116 is sufficiently released. Generally, the overlap 122, should be sized such that the cover deployment flaps 110a, 110b remain between the airbag 116 and the airbag cover 120 until the airbag cover 120 opens.

Beyond the embodiments depicted in the figures, multiple variations and embodiments are possible for the cover deployment flap 10. For example, the cover deployment flaps 110a, 110b in FIG. 3 are comprised of a first cover deployment flap 110a and a second cover deployment flap 110b which are two separate pieces. However, an alternative embodiment may have a similarly configured cover deployment flap that is a single piece. In this embodiment, the cover deployment flap would be a generally long rectangular piece of material with the airbag placed substantially in the center of the rectangular piece of material. Each of the elongated ends would then be folded around the airbag, forming an overlap on the top of the airbag. This would decrease the number of members being manufactured and assembled as well as reduce the assembly time and part count of the airbag module.

Another embodiment of the cover deployment flaps could have the cover deployment flaps as an integrally formed part of the airbag. The buffer flaps may be formed of the same material and during the same processes in which the airbag is manufactured. Alternatively, the cover deployment flap may be attached to the airbag after the airbag is formed by a sewing process. In yet another embodiment, the cover deployment flaps may be attached to the airbag housing. Thus when the airbag deploys, the cover deployment flaps will remain with the housing.

The cover deployment flaps may provide additional reinforcement protection by incorporating portions of the cover deployment flaps that overhang the sides of the undeployed airbag. The sides are defined in FIG. 3 as the edges of the cover deployment flaps 110a, 110b that are perpendicular to the overlap 122. To include overhanging cover deployment flap edges, the cover deployment flaps 110a, 110b would simply need to be wider than the undeployed airbag 116. The overhanging edges of the cover deployment flaps 110a, 110b would provide added protection to the edges to the airbag 116 that may be susceptible to damage by contact with the airbag cover 120 or the airbag housing.

Figure 4:
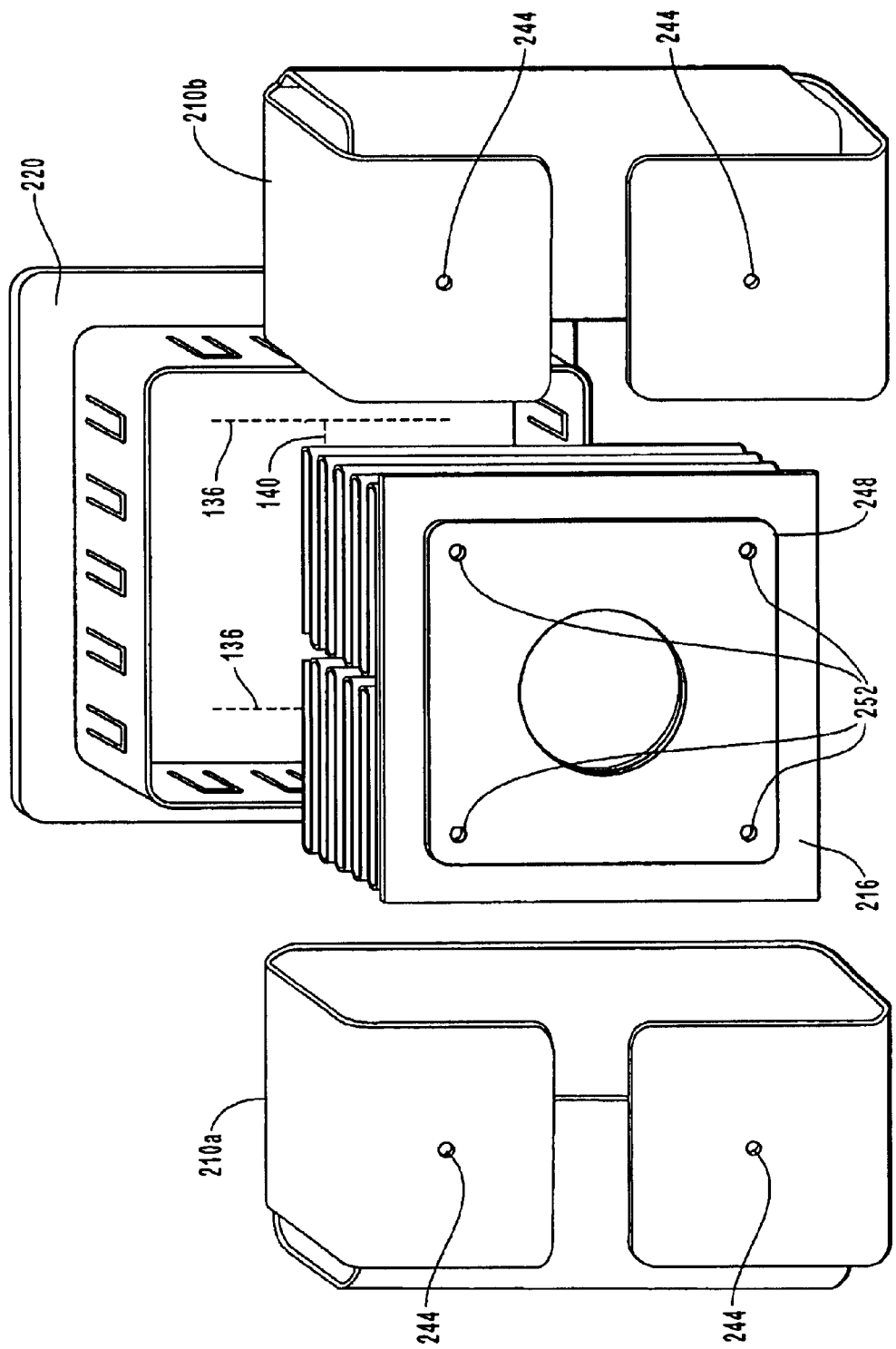
FIG. 4 is an exploded assembly view of another embodiment of a cover deployment flap and airbag module.

FIG. 4 is an exploded assembly view of an airbag module demonstrating another embodiment of the cover deployment flaps 210a, 210b, wherein the cover deployment flaps are folded in an envelope configuration. Each of the cover deployment flaps 210a, 210b is made of a pliant material that allows it to be folded in various shapes. An airbag 216 is then situated within the envelope cover deployment flaps 210a, 210b. The airbag 216 and the cover deployment flaps 210a, 210b are then placed within the airbag cover 220. Similar to other embodiments, the opening location of the cover deployment flaps 210a, 210b should be parallel to the folded cushion orientation. Additionally, the cover deployment flaps 210a, 210b in the embodiment depicted in FIG. 4 may have an overlap, depending upon the type and design of the airbag 216 and airbag cover 220.

The cover deployment flaps 210a, 210b may also be comprised of any numbers of shapes and materials to accommodate various airbag module designs. The material type should generally be pliable to allow folding and should be able to provide insulation and reinforcement to the airbag 216 as it deploys through the airbag cover 220. Likewise, the shape of the cover deployment flaps 210a, 210b in the folded and unfolded configurations can vary greatly depending upon the type of airbag 216 and airbag cover 220. The present embodiment of the cover deployment flaps 210a, 210b can be accomplished through various shapes and materials without departing from the disclosure of this invention.

The embodiment of FIG. 4 further incorporates mounting holes 244 in the cover deployment flaps 210a, 210b that allow for the cover deployment flaps 210a, 210b to be fixed to a portion of the airbag housing 248. The portion of the airbag housing 248 depicted in FIG. 4 has a plurality of holes 252 in which a plurality of pins may be mounted. The mounting holes 244 in the cover deployment flaps 210a, 210b may then be mounted to the pins to secure the cover deployment flaps 210a, 210b to the airbag module.

One having ordinary skill in the art will recognize that additional embodiments of the present apparatus are possible without departing from the present disclosure. The apparatus may simply have at least one cover deployment flap situated between an undeployed airbag and an airbag cover. The cover deployment flap should be configured to protect the airbag by receiving some of the stresses induced as the airbag and the cover deployment flap push open the airbag cover as the airbag deploys.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag reinforcing member, comprising:
   a first cover deployment flap configured to be selectively disposed between an undeployed airbag and an airbag cover, wherein the cover deployment flap is configured to receive a stress induced by the airbag as it is deployed through the airbag cover; and
   a second cover deployment flag that contacts the bottom of the airbag, wherein the first cover deployment flap and the second cover deployment flap are configured to have an overlap that has a generally rectangular share when the airbag is undeployed.

2. The airbag reinforcing member, as recited in claim 1, wherein the first cover deployment flap has a first end and a second end, wherein the first cover deployment flap substantially enwraps a first portion of the airbag and the second cover deployment flap substantially enwraps a second portion of the airbag.

3. The airbag reinforcing member, as recited in claim 2, wherein the first portion and the second portion are generally equal.

4. The airbag reinforcing member, as recited in claim 1, wherein the first cover deployment flap is configured to remain disposed between the airbag and the airbag cover during expansion of the airbag through the airbag cover.

5. The airbag reinforcing member, as recited in claim 1, wherein the overlap is configured to be substantially situated between the undeployed airbag and the airbag cover.

6. The airbag reinforcing member, as recited in claim 5, wherein the overlap of the first cover deployment flap and the second cover deployment flap is configured to be maintained until the airbag substantially opens a tear seam in the airbag cover.

7. The airbag reinforcing member, as recited in claim 1, wherein the first cover deployment flap enwraps a first portion of the airbag in a "C" shaped configuration and the second cover deployment flap enwraps a second portion of the airbag in a "C" shaped configuration.

8. The airbag reinforcing member, as recited in claim 7, wherein the "C" shaped configuration of the first portion and the "C" shaped configuration of the second portion have an overlap, wherein the overlap is substantially situated between the undeployed airbag and the airbag cover.

9. The airbag reinforcing member, as recited in claim 1, wherein the first cover deployment flap has an opening location that is situated substantially parallel to a fold seam in the airbag.

10. The airbag reinforcing member, as recited in claim 1, wherein the first cover deployment flap is integrally coupled to the airbag.

11. The airbag reinforcing member, as recited in claim 1, wherein the first cover deployment flap is comprised of the same material as the airbag.

12. The airbag reinforcing member, as recited in claim 1, wherein the first cover deployment flap is generally rectangular.

13. A reinforced airbag comprising:
    an airbag having a folded configuration and deployed configuration; and
    a first cover deployment flap and a second cover deployment flap that contacts the bottom of the airbag, wherein the first cover deployment flap and the second cover deployment flap generally enwrap the airbag in the folded configuration and reinforces the airbag as it deploys through an airbag cover, and wherein the first cover deployment flap and the second cover deployment flap are configured to have an overlap that has a generally rectangular shape when the airbag is in the folded configuration.

14. The reinforced airbag, as recited in claim 13, wherein the folded configuration of the airbag has a fold seam.

15. The reinforced airbag, as recited in claim 14, wherein the first cover deployment flap has an opening location that is substantially parallel to the fold seam.

* * * * *